(12) United States Patent
Park

(10) Patent No.: US 6,875,361 B2
(45) Date of Patent: Apr. 5, 2005

(54) WATER PURIFYING DEVICE

(75) Inventor: Gun Shik Park, Bucheon (KR)

(73) Assignee: Redox Co., Ltd., Kyoungki-Do (KR)

( * ) Notice: Subject to any disclaimer, the term of this patent is extended or adjusted under 35 U.S.C. 154(b) by 391 days.

(21) Appl. No.: 10/071,611

(22) Filed: Feb. 8, 2002

(65) Prior Publication Data

US 2002/0162754 A1 Nov. 7, 2002

(51) Int. Cl.$^7$ .............................. C02F 1/461; C25B 9/00
(52) U.S. Cl. .................... 210/748; 210/198.1; 210/243; 422/22; 422/186.04; 205/742; 204/242
(58) Field of Search .................................. 210/748, 764, 210/198.1, 205, 243, 169; 422/22, 186, 186.04; 205/701, 742; 204/242

(56) References Cited

U.S. PATENT DOCUMENTS 4,917,782 A * 4/1990 Davies ........................ 205/743

FOREIGN PATENT DOCUMENTS

| JP | 04-40285 | 2/1992 |
|---|---|---|
| KR | 10-1994-23808 | 11/1994 |
| KR | 10-1997-70696 | 11/1997 |
| KR | 10-1998-09194 | 4/1998 |
| KR | 10-1998-29456 | 7/1998 |
| KR | 10-1998-66131 | 10/1998 |

OTHER PUBLICATIONS

English language abstract citing Japanese Patent No. 04–40285 (item A).
English language abstract citing Korean Patent No. 10–1994–23808 (item B).
English language abstract citing Korean Patent No. 10–1997–70696 (item C).
English language abstract citing Korean Patent No. 10–1998–66131 (item D).
English language abstract citing Korean Patent No. 10–1998–09194 (item E).
English language abstract citing Korean Patent No. 10–1998–29456 (item F).

* cited by examiner

Primary Examiner—Frank M. Lawrence
(74) Attorney, Agent, or Firm—Heller Ehrman White & McAuliffe LLP

(57) ABSTRACT

The present invention relates to a water purifying device including: a cell unit consisting of a high purity ceramic for obtaining far infrared ray, and having a shape according to a kind of water tank, a ring-shaped Volta cell consisting of a non-ferrous metal being provided in the cell unit; and a lump unit being connected to the cell unit through a metal coil, and consisting of ceramic, a conductive lump consisting of a non-ferrous metal being provided in the lump unit. Accordingly, the water purifying device is easily installed in the water tank, for disinfecting bacteria, restricting generation of bacteria, removing odor, and facilitating growth of aquatic plants and fishes. As a result, a number of changing water in the water tank can be considerably reduced, to improve efficiency.

9 Claims, 2 Drawing Sheets

WATER PURIFYING DEVICE

BACKGROUND OF THE INVENTION

1. Field of the Invention

The present invention relates to a water purifying device, and in particular to an improved water purifying device which can efficiently purify water without using a special drug or purifying facility, by simplifying a structure to be easily put in a purifying place such as an aquarium, pond and factory by using an electrolytic analysis of a Volta cell.

2. Description of the Background Art

In general, a water purifying device has been used for potable water or industrial water. A water purifying device for a pond, aquarium and fish basin including an organism has not been developed. Since the aquarium or fish basin does not have the water purifying device, it is inconvenient to periodically change water or clean a water tank.

Especially, to change water of a large aquarium or fish basin is complicated, and requires much time and cost. In addition, moss is grown and various foreign substances are generated in stagnant water such as a pond, to decay the water.

SUMMARY OF THE INVENTION

Accordingly, an object of the present invention is to provide a water purifying device which can be easily installed in water, for disinfecting bacteria, removing odor, and facilitating growth of aquatic plants and fishes.

In order to achieve the above-described object of the present invention, there is provided a water purifying device including: a cell unit having a volta cell and completed cell formed by coiling a metal coil around a volta cell, and being surrounded with an external housing consisting of ceramic for obtaining far infrared rays and having a plurality of through holes at its whole circumferential surface for water flow; a lump unit having a conductive lump, and being surrounded with an external housing consisting of ceramic for obtaining far infrared rays, and having a plurality of through holes at its whole circumferential surface for water flow; and a connection line for connecting the cell unit and the lump unit.

According to the present invention, the Volta cell is formed in a ring shape, and the external housings of the cell unit and the lump unit have natural and familiar shapes according to scenic spots and places of historic interest or animals. In addition, a connector is used between the cell unit and the lump unit to easily install and operate the water purifying device.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE PREFERRED EMBODIMENTS

Firstly, a theoretical background of a electrochemical reaction for a water purifying device of the present invention will now be described.

In general, when a chemical reaction for generating a product from a reactant is performed, an oxidation state variation of partial or whole atoms which are participated in reaction, namely a state variation of the atoms is followed. When electrons are transferred according to the change of the atoms state, it is called the electrochemical reaction.

The electrochemical reaction relates to various fields of batteries, electrometallurgy, metal surface treatment and metal corrosion or the like, and is especially employed to fabricate a device for obtaining an electric work. In addition, various measurement devices have been developed on the basis of the electrochemical reaction.

When electric substances such as metal ions relate to the chemical reaction in an aqueous solution, molten salt or solid electrolyte, or are diffused due to a different density, an electromotive force (emf) is generated. Here, an electric work can be obtained from the reaction system by forming an external electric circuit outside the solution. Such a system is called an electrochemical cell.

In general, when a metal is put in a solution having its own ions, a potential difference is generated between the metal and solution. Such a potential difference is called a half-cell potential or single electrode cell potential. It is convenient to quantize an ionization tendency by using the single electrode cell potential. However, it is impossible to produce a cell consisting of one electrode and to measure a potential of the single electrode cell. However, a concept of the single electrode cell potential is useful. Therefore, for example, a potential value of a single electrode can be relatively measured by selecting a specific standard single electrode having a potential of zero, and forming an electrochemical cell with the single electrode and another single electrode.

The standard single electrode used in the aqueous solution is a standard hydrogen electrode (SHE), which is a hydrogen electrode containing a gas below an atmospheric pressure of one contacted with an aqueous solution containing hydrogen ions having activity of one. A standard single electrode of metal is comprised of pure metal which is contacted with a solution containing its own self metal ions with activity of one (generally, a standard state has solution containing 1 g-mole of metal ions). A standard potential of the single electrode of the metal is decided comparing with the standard hydrogen electrode.

The water purifying device in accordance with a preferred embodiment of the present invention will now be described in detail with reference to the accompanying drawings.

Figure 1:
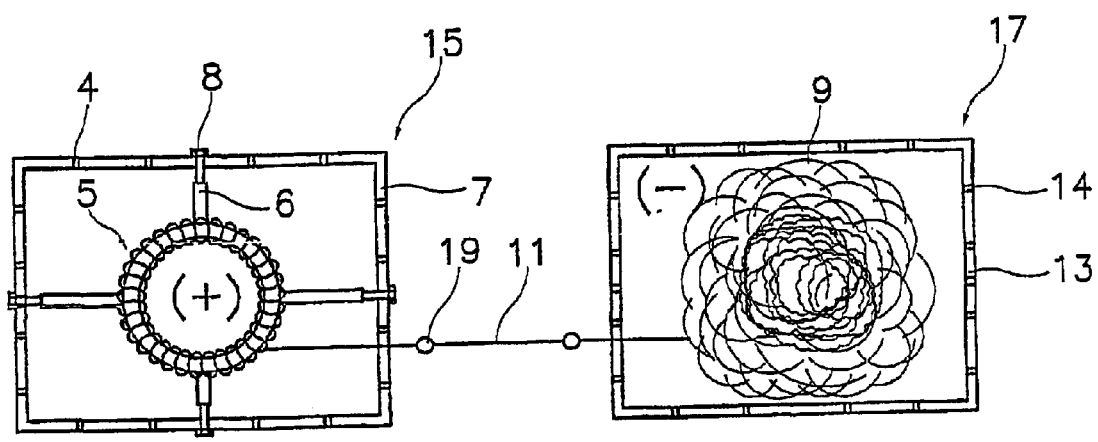
FIG. 1 is a structure diagram illustrating a water purifying device in accordance with the present invention.
Figure 2:
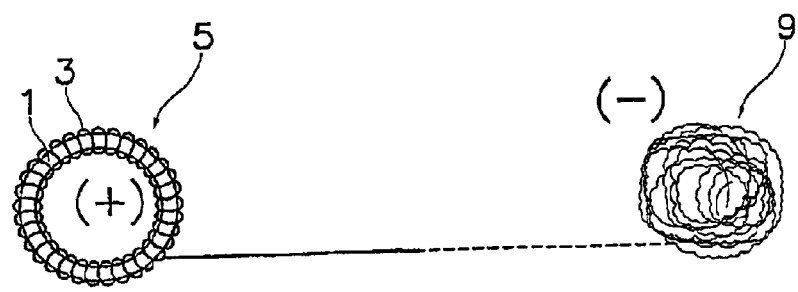
FIG. 2 illustrates a completed cell and a conductive lump of FIG. 1.

FIG. 1 is a schematic cross-sectional diagram illustrating the water purifying device in accordance with the present invention, and FIG. 2 illustrates a Volta cell and a conductive lump of FIG. 1, when they are separated from external housings.

Referring to FIGS. 1 and 2, the water purifying device includes: a cell unit 15 having a Volta cell 1 and being surrounded with an external housing 7 consisting of ceramic; and a lump unit 17 being connected to the cell unit 15 through a connection line 11 consisting of a metal coil, and having a conductive lump 9 of a predetermined volume and being surrounded with an external housing 13 consisting of ceramic.

The cell unit 15 includes a completed cell 5 inside. As illustrated in FIG. 2, the completed cell 5 is formed by coiling the metal coil 3 around the ring-shaped Volta cell 1.

In this embodiment, the Volta cell 1 is formed in a ring shape, but may be formed in a bar or other shapes. The Volta cell 1 is formed by combinations of non-ferrous metals, for example aluminum alloy and zinc. The metal coil 3 coiling around the ring-shaped Volta cell 1 consists of copper alloy or silver.

The external housing 7 receiving the completed cell 5 consisting of the ring-shaped Volta cell 1 and the metal coil consists of ceramic. A plurality of through holes 4 are formed on the entire housing 7 so that water can inwardly flow toward the internal cell 5. In order to fix the internal cell 5 in the housing 7, a plurality of protruding strips 6 are formed around the Volta cell 1. Here, fixing screws 8 are inserted into the protruding strips 6 to fix the cell 5 in the housing 7.

The conductive lump unit 17 includes a conductive lump 9 and is surrounded with an external housing 13 consisting of ceramic. A plurality of through holes 14 are formed at the whole circumferential surface of the housing 13 for water flow. The lump 9 consists of a non-ferrous metal scrap such as Al or Zn.

The external housings 7, 13 of the cell unit 15 and the lump unit 17 have suitable shapes according to a peripheral environment. For example, when the water purifying device is installed in a pond of scenic spots and places of historic interest, it has a related shape or animal shape such as a turtle or rabbit.

The connection line 11 connecting the cell unit 15 and the lump unit 17 preferably is a metal coil consisting of a copper alloy or silver, and may include a connector 19 for easily installing and operating the water purifying device at its middle portion.

Figure 3:
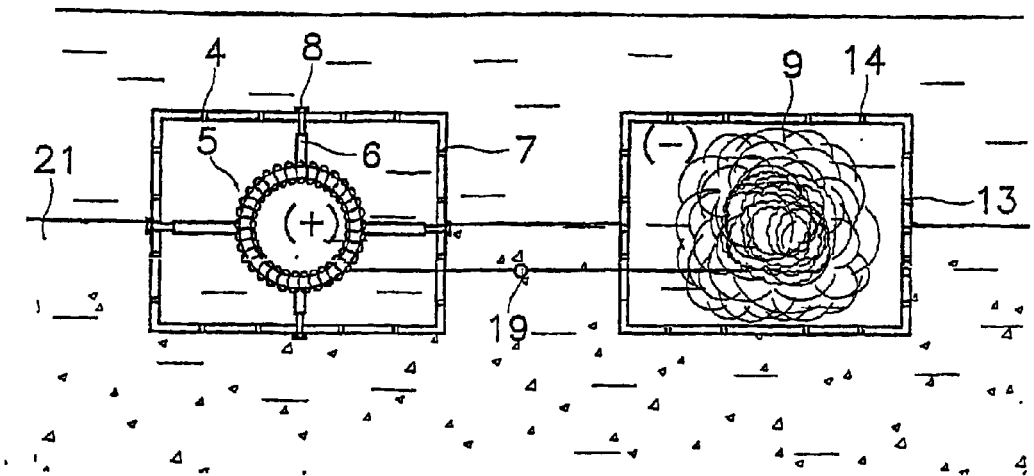
FIG. 3 shows a state where the water purifying device is put in water in accordance with the present invention.

FIG. 3 shows a state where the cell unit 15 and the lump unit 17 of the water purifying device is installed in a water tank in accordance with the present invention. The cell unit 15 and the lump unit 17 are positioned in sand 21 of the water tank by a predetermined thickness, having their upper portions exposed from the sand 21. Therefore, since the exposed external housings 7, 13 of the cell unit 15 and the lump unit 17 is exposed exteriorly, it is desired to have natural shapes according to a shape of the water tank.

Figure 4:
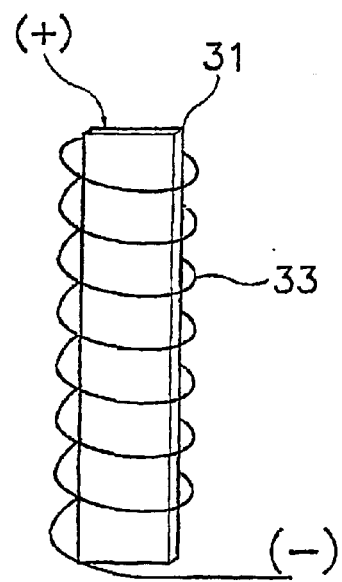
FIG. 4 illustrates another example of a Volta cell of the water purifying device in accordance with the present invention.

FIG. 4 illustrates another example of the Volta cell of the water purifying device in accordance with the present invention. The Volta cell 31 is formed in a bar shape. A metal coil 33 is coiled around the Volta cell 31. That is, the Volta cell may be formed in various shapes.

The water purifying principle and operation of the water purifying device in accordance with the present invention will now be explained.

For reference, the water purifying device is based upon the technical theory suggested in Korean Patent Reg. No. 188328 (entitled by 'Device for Preventing Corrosion and Scale in Steel Pipe Line') of the applicant concerned. The technical theory will now be described with reference to FIG. 3.

When a unit including the Volta cell 1 and the external housing 7 being positioned outside the Volta cell 1 and consisting of ceramic for generating far infrared rays wave, namely the cell unit 15 is positioned in water, water is polarized. Such polarization is generated due to a formation of oxidation and reduction potential on electrode in water.

A property of tap water will now be explained.

That is, a total hardness of the tap water ranges from 100 to 150 ppm, a total dissolved substance ranges from 129 to 200 ppm, an electric conductivity ranges from 150 to 200 $\mu s/cm^2$, $Cl^-$ is over 10 ppm and a frequency is about 120 Hz.

In the case of the tap water, a center portion of the ring-shaped Volta cell 1 becomes an anode (+), an oxidation reduction potential (ORP) ranges from 400 to 600 mV, and a hydrogen density ranges from Ph 6 to 4.

An end portion of the metal coil 3 coiling around the Volta cell 1 becomes a cathode, the ORP ranges from −400 to −600 mV, and the hydrogen density ranges from Ph 8 to 10.

On the other hand, a variation of the ORP is represented by the following formula:

$$E[\pm mV] = Eo - \frac{Rt}{nf}\log\frac{Cred}{Cox}$$

wherein, Eo denotes a standard potential of water (±mV), nf denotes an electron Faraday constant, Rt denotes a gas temperature constant, Cox denotes a total oxidation group, and Cred denotes a total reduction group.

As a result, an oxidation Cox group, for example $Cl^-$, O, $O_2$, $O_3$ and $OH^-$ are formed in the anode, and a reduction Cred group, for example $Na^+$, $H^+$ and $H_2O$ are formed in the cathode, thus to be saturated.

Here, oxygen is activated to re-combine two electrons ($e^-$) due to instability of hydrogen (H) having a potential of zero, thereby water molecules are activated.

On the other hand, a dissolved oxygen (DO) in water is maximally 20.9% in an air pressure, and calculated by the following formula and an air contacting area ($cm^2$) of water:

DO=H*Xo (H: Henry constant, Xo: air oxygen amount) [mg O/l]

An amount of saturated water is maintained according to activation of the water molecules. In the case of the tap water, an active frequency of the water molecules is about 120 Hz. Here, the water molecules are continuously activated by far infrared rays wave, without increasing a line width of the far infrared rays wave.

In the water purifying device of the present invention, the Volta cell 1 coiled by the coil 3 and the lump 9 consisting of the conductive non-ferrous metal are combined, and the external housings 7, 13 receiving the cell 5 and the lump 9 consist of high purity ceramic, to apply the far infrared rays of about 5 to 20 $\mu m/cm^2$.

As described above, hydrogen (H) having a potential of zero is sensitive to slight electric charges and unstable. When a process of re-combining hydrogen and oxygen is repeated, a pole of the water molecules is maintained at about Ph 7.5 due to activation, thus a cluster of the water molecules increase in number.

When strong electricity is applied to the potential of the water molecules, fat or protein of microorganism cells, nucleic acid and enzymes is damaged, and thus such elements are not normally operated. Especially, it has been publicly known that a damage of nucleic acid influences on genetic information of DNA and RNA.

A maximal water potential of the water purifying device of the present invention is 900 mV (tap water). Considering that a water potential of the microorganism is only a few mV, the water purifying device sufficiently disinfects bacteria of the microorganism.

On the other hand, generation of algae (chlorophyat) is visible in the fish basin due to adhering substances generated from the algae by growth of the microorganisms and electrostatic combinations (electric ions).

Accordingly, generation of bacteria is prevented, and a hydroxyl group (OH$^-$) and a hydrogen group (H$^+$) of a contaminant are alternated. As a result, both ions exclude each other, and thus bacteria is not strangulated in the water tank.

The center portion of the ring-shaped Volta cell 1 has acid oxidation water and the metal coil 3 coiling around the Volta cell 1 has alkali reduction water, which efficiently removes a sticky contamination source.

In general, water of the water tank is easy to contaminate. Moreover, the water tank is mostly maintained for an extended period of time. However, the water purifying device of the present invention can efficiently treat water by applying the polarization and far infrared rays wave.

The following table shows the dissolved oxygen (DO), biochemical oxygen demand (BOD) and chemical oxygen demand (COD) measured after a predetermined period to observe water state variations of the water tank, when the water purifying device is put in the water tank.

<TABLE> [unit:mg/l]

A measurement device of the experiment is USA HACH-DR2000 type.

| Item | COD | DO | Total Nitrogen | BOD | Remarks |
|---|---|---|---|---|---|
| 1 month | Below 1 (3~5) | Over 7.5 (below 5) | Below 0.3 (2~3) | Below 1.5 (1.5~2) | Values of ( ) are obtained in general water tank |
| 3 months | Below 2 (5~10) | Over 5 (below 5) | Below 0.5 (3~5) | Below 3 (3~7) | |
| 6 months | Below 3 (10~15) | Over 5 (below 3) | Below 0.6 (5~10) | Below 5 (7~8) | |

As shown in the table, when the water purifying device is used in the water tank, the first level water is measured after one month, and the second level water is measured after three to six months. That is, the water purifying device of the present invention restricts NH$_3$, NH$_3$-N, H$_2$S and nitrate nitrogen, and remarkably reduces a density of organic substances such as bacteria of chlorophyat due to sublimation (vaporization), to stabilize the BOD, and COD for a few months.

As discussed earlier, the water purifying device of the present invention has a simple and small structure, and thus is easily installed in the water tank. Moreover, the water purifying device disinfects bacteria, restricts generation of bacteria, removes odor, and facilitates growth of aquatic plants and fishes. As a result, a number of changing water in the water tank can be considerably reduced, to improve efficiency.

The water purifying device of the present invention can be variously applied to a water tank of aquarium fishes, a large water tank of fry, a freshwater place such as a pond or lake, an artificial fountain, a factory using purified water, and other contained water.

What is claimed is:

1. A water purifying device comprising:
    a cell unit having a volta cell, completed cell formed by coiling a metal coil around a Volta cell, and being surrounded with an external housing consisting of ceramic for obtaining far infrared rays and having a plurality of through holes at its whole circumferential surface for water flow;
    a lump unit having a conductive lump and being surrounded with an external housing consisting of ceramic for obtaining far infrared rays, and having a plurality of through holes at its whole circumferential surface for water flow; and
    a connection line for connecting the cell unit and the lump unit.

2. The device according to claim 1, wherein the Volta cell is formed in a ring shape.

3. The device according to claim 1, wherein the external housings of the cell unit and the lump unit have natural and familiar shapes according to scenic spots and places of historic interest or animals.

4. The device according to claim 1, wherein a connector is formed at the middle portion of the connection line to easily connect the cell unit and the lump unit.

5. A water purifying device comprising:
    a cell unit having a completed electrically conductive cell formed by coiling a metal coil around a Volta cell, and having an external housing in which the completed cell is supported, the external housing having a plurality of through holes such that water may flow through the external housing;
    a lump unit having a conductive lump material and having an external housing in which the conductive lump material is contained, the external housing having a plurality of through holes such that water may flow through the external housing; and
    a conductive connection line that connects the metal coil of the cell unit and the conductive lump material of the lump unit;
    wherein the cell unit external housing is constructed of a material that enables applying infrared rays such that water in the cell unit external housing becomes polarized.

6. A water purifying device according to claim 5, wherein the Volta cell becomes an anode, and an end portion of the metal coil becomes a cathode.

7. A water purifying device according to claim 5, wherein water at the Volta cell has a hydrogen density (Ph) of approximately 6 to 4, and water at an end portion of the metal coil has a hydrogen density of approximately 8 to 10.

8. A water purifying device according to claim 5, wherein the conductive connection line comprises a metal coil.

9. A method of purifying water, the method comprising:
    placing a cell unit in a container of water, the cell unit having a completed electrically conductive cell formed by coiling a metal coil around a Volta cell, and having an external housing in which the completed cell is supported, the external housing having a plurality of through holes such that water may flow through the external housing, wherein the cell unit external housing is constructed of a material that enables applying infrared rays such that water in the cell unit external housing becomes polarized;
    placing a lump unit in the container of water, the lump unit having a conductive lump material and having an external housing in which the conductive lump material is contained, the external housing having a plurality of through holes such that water may flow through the external housing; and
    connecting the cell unit and the lump unit with a conductive connection line.

* * * * *

UNITED STATES PATENT AND TRADEMARK OFFICE
CERTIFICATE OF CORRECTION

PATENT NO. : 6,875,361 B2
DATED : April 5, 2005
INVENTOR(S) : Gun Shik Park

It is certified that error appears in the above-identified patent and that said Letters Patent is hereby corrected as shown below:

Title page,
Insert Item -- [30]   Foreign Application Priority Data
   This application claims the benefit of priority to International Patent Application No. PCT/KR2001/000977 filed 08 June 2001, which claims the claims the benefit of Korean Patent Application No. 10-2000-0031721 filed on 09 June 2000. The disclosures of the aforementioned applications are hereby incorporated by reference. --

Signed and Sealed this

Thirty-first Day of May, 2005

JON W. DUDAS
*Director of the United States Patent and Trademark Office*